United States Patent
Larsen et al.

(10) Patent No.: US 12,212,271 B2
(45) Date of Patent: Jan. 28, 2025

(54) SYSTEM AND METHOD FOR PROVIDING GRID-FORMING CONTROL FOR A DOUBLE-FED WIND TURBINE GENERATOR

(71) Applicant: General Electric Company, Schenectady, NY (US)

(72) Inventors: Einar Vaughn Larsen, Ballston Lake, NY (US); Dustin Howard, Atlanta, GA (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/792,811

(22) PCT Filed: Jan. 16, 2020

(86) PCT No.: PCT/US2020/013787
§ 371 (c)(1),
(2) Date: Jul. 14, 2022

(87) PCT Pub. No.: WO2021/145877
PCT Pub. Date: Jul. 22, 2021

(65) Prior Publication Data
US 2023/0041049 A1    Feb. 9, 2023

(51) Int. Cl.
*H02P 9/00* (2006.01)
*F03D 9/25* (2016.01)
(Continued)

(52) U.S. Cl.
CPC .............. *H02P 9/007* (2013.01); *F03D 9/255* (2017.02); *H02J 3/381* (2013.01); *H02J 2300/28* (2020.01); *H02P 2101/15* (2015.01)

(58) Field of Classification Search
CPC ...... H02P 9/007; H02P 2101/15; F03D 9/255; H02J 3/381; H02J 2300/28
See application file for complete search history.

(56) References Cited

U.S. PATENT DOCUMENTS

| | | |
|---|---|---|
| 5,798,631 A | 8/1998 | Spee et al. |
| 5,798,633 A | 8/1998 | Larsen et al. |

(Continued)

FOREIGN PATENT DOCUMENTS

| | | |
|---|---|---|
| CN | 102510120 A | 6/2012 |
| CN | 106953365 A | 7/2017 |

(Continued)

OTHER PUBLICATIONS

PCT International Search Report & Written Opinion Corresponding to PCT/US2020/013787 on Sep. 9, 2020.

(Continued)

*Primary Examiner* — Sean Gugger
(74) *Attorney, Agent, or Firm* — Dority & Manning, P.A.

(57) ABSTRACT

A method for providing grid-forming control of a double-fed generator of a wind turbine includes receiving, via a stator voltage regulator of a converter controller, one or more voltage commands from an external controller. Further, the method includes determining, via the stator voltage regulator, one or more rotor current commands as a function of a magnetizing current command and a stator current feedback signal of the double-fed generator. Thus, the method includes controlling a rotor voltage of the double-fed generator using the one or more rotor current commands to achieve the one or more voltage commands.

15 Claims, 10 Drawing Sheets

(51) Int. Cl.
*H02J 3/38* (2006.01)
*H02P 101/15* (2016.01)

(56) References Cited

U.S. PATENT DOCUMENTS

| | | |
|---|---|---|
| 6,420,795 B1 | 7/2002 | Mikhail et al. |
| 7,016,793 B2 | 3/2006 | Ye et al. |
| 7,119,452 B2 | 10/2006 | Larsen |
| 7,456,695 B2 | 11/2008 | Weng et al. |
| 7,804,184 B2 | 9/2010 | Yuan et al. |
| 9,270,194 B2 | 2/2016 | Brogan et al. |
| 9,413,267 B2 | 8/2016 | Adloff |
| 9,450,415 B2 | 9/2016 | Larsen et al. |
| 9,660,452 B2 | 5/2017 | Routimo |
| 9,660,453 B2 | 5/2017 | Majumder |
| 9,787,174 B2 | 10/2017 | Letas et al. |
| 10,156,225 B2 | 12/2018 | Huang et al. |
| 10,305,283 B1 | 5/2019 | Larsen |
| 10,985,567 B1 | 4/2021 | Vergara et al. |
| 11,177,660 B2 | 11/2021 | Ramamurthy et al. |
| 11,411,520 B1 | 8/2022 | Howard et al. |
| 2005/0135031 A1 | 6/2005 | Colby et al. |
| 2009/0079191 A1 | 3/2009 | Mari et al. |
| 2009/0121483 A1 | 5/2009 | Xiong et al. |
| 2009/0200803 A1* | 8/2009 | Ichinose ............... H02J 3/44 290/44 |
| 2009/0278351 A1 | 11/2009 | Rivas et al. |
| 2010/0052322 A1 | 3/2010 | Fortmann et al. |
| 2010/0142237 A1* | 6/2010 | Yuan ................... H02J 3/46 290/44 |
| 2010/0157634 A1 | 6/2010 | Yu et al. |
| 2013/0027994 A1 | 1/2013 | Nelson et al. |
| 2013/0234435 A1 | 9/2013 | Wagoner et al. |
| 2014/0062424 A1 | 3/2014 | Larsen et al. |
| 2015/0123475 A1 | 5/2015 | Premm et al. |
| 2017/0272014 A1 | 9/2017 | Ren et al. |
| 2018/0109201 A1* | 4/2018 | Li ........................ F03D 17/00 |
| 2019/0157876 A1 | 5/2019 | Dobrowolski et al. |
| 2019/0214927 A1 | 7/2019 | Letas |
| 2020/0014306 A1 | 1/2020 | Riar et al. |
| 2020/0295671 A1 | 9/2020 | Huynh et al. |
| 2021/0033069 A1 | 2/2021 | Lindholm et al. |
| 2021/0047997 A1 | 2/2021 | Abeyasekera |
| 2022/0082087 A1 | 3/2022 | Howard et al. |
| 2022/0090578 A1 | 3/2022 | Larsen et al. |
| 2022/0178349 A1 | 6/2022 | Howard et al. |
| 2022/0181883 A1 | 6/2022 | Larsen et al. |

FOREIGN PATENT DOCUMENTS

| | | |
|---|---|---|
| CN | 108683198 A | 10/2018 |
| CN | 109494709 A | 3/2019 |
| CN | 110112900 A | 8/2019 |
| DE | 102007005165 A1 | 8/2007 |
| EP | 2523298 B1 | 11/2012 |
| EP | 2993753 A1 | 3/2016 |
| EP | 3487027 A1 | 5/2019 |
| EP | 3512063 A1 | 7/2019 |
| EP | 4106179 A1 | 12/2022 |
| WO | WO2011/154532 A2 | 12/2011 |
| WO | WO2014/072159 A2 | 5/2014 |
| WO | WO2015131958 A1 | 9/2015 |
| WO | WO2019/164792 A1 | 8/2019 |

OTHER PUBLICATIONS

Dokus et al., Sequence Impedance Characteristics of Grid-Forming Converter Controls, Institute for Drive Systems and Power Electronics (IAL), Leibniz University Hannover, Hannover, Germany.
Gao et al., Resonance Damping of DFIG System Based on Multi-Branch Virtual Impedance, 2019 IEEE International Conference on Industrial Technology (ICIT), IEEE, Feb. 13, 2019, pp. 527-532.
Golestan et al., Three-Phase PLLs: A Review of Recent Advances, IEEE Transactions on Power Electronics, vol. 32, No. 3, May 2016, pp. 1894-1907.
Liu et al., Mitigation of SSR by Embedding Subsynchronous Notch Filters into DFIG Converter Controllers, IET Generation, Transmission & Distribution, IET, vol. 11, No. 11, UK, Jul. 24, 2017, pp. 2888-2896.
Miller et al., Design and Commissioning of a 5 MVA, 2.5 MWh Battery Energy Storage System, Proceedings of 1996 Transmission and Distribution Conference and Exposition, Los Angeles CA, 1996, pp. 339-345. https://doi.org/10.1109/TDC.1996.545957.
Vijay, et al., Unbalance Mitigation Strategies in Microgrids, IET Power Electronics, IET, vol. 13, No. 9, UK, Jul. 24, 2020, pp. 1687-1710.
Wang et al., Grid-Synchronization Stability of Converter-Based Resources—An Overview, IEEE Open Journal of Industry Applications, IEEE, vol. 1, Aug. 31, 2020, pp. 115-134.

* cited by examiner

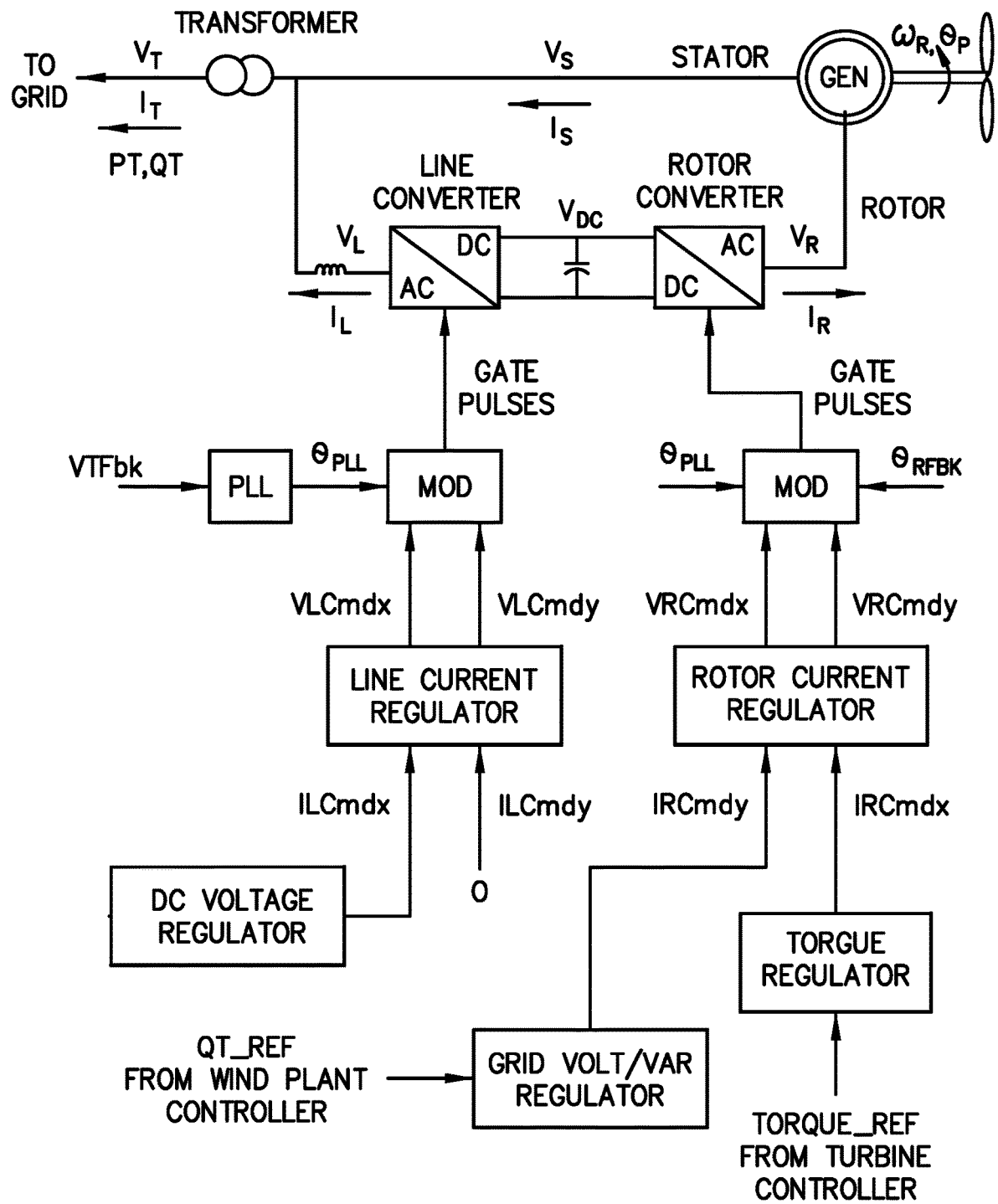
FIG. -1-
PRIOR ART

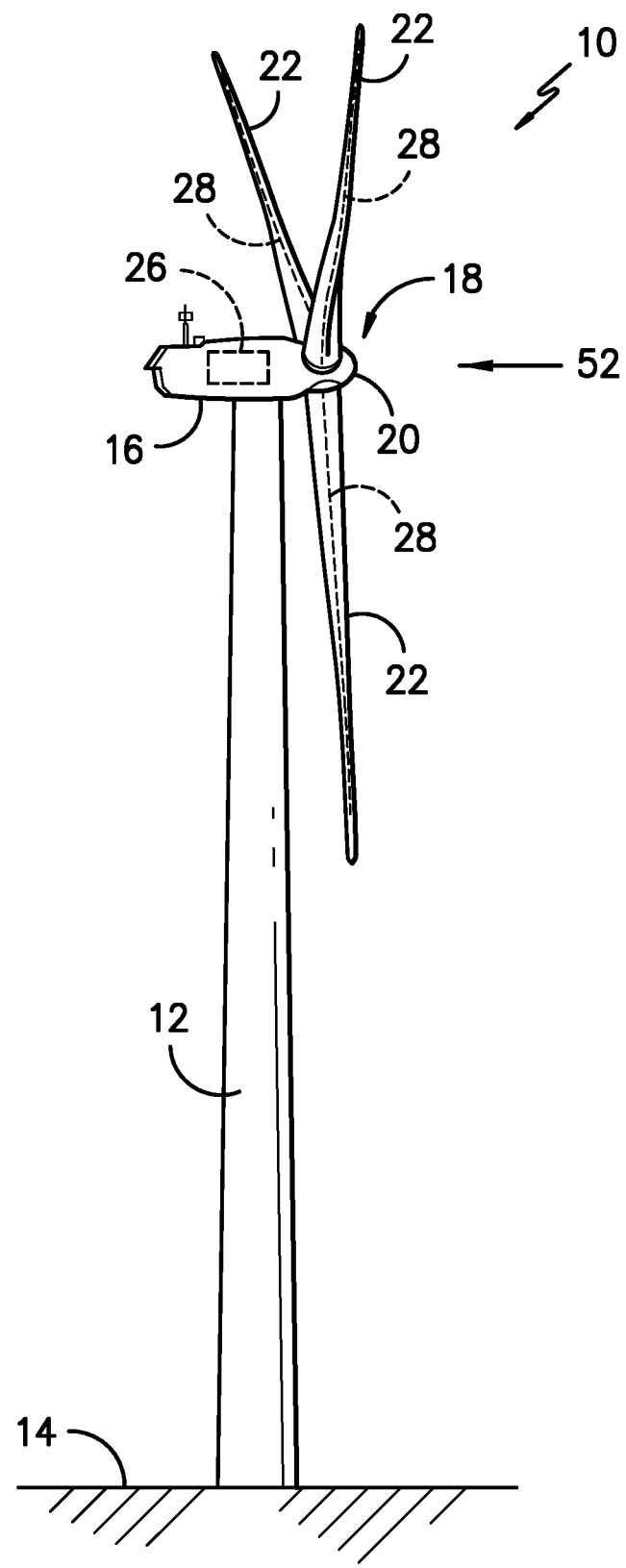
FIG. -2-

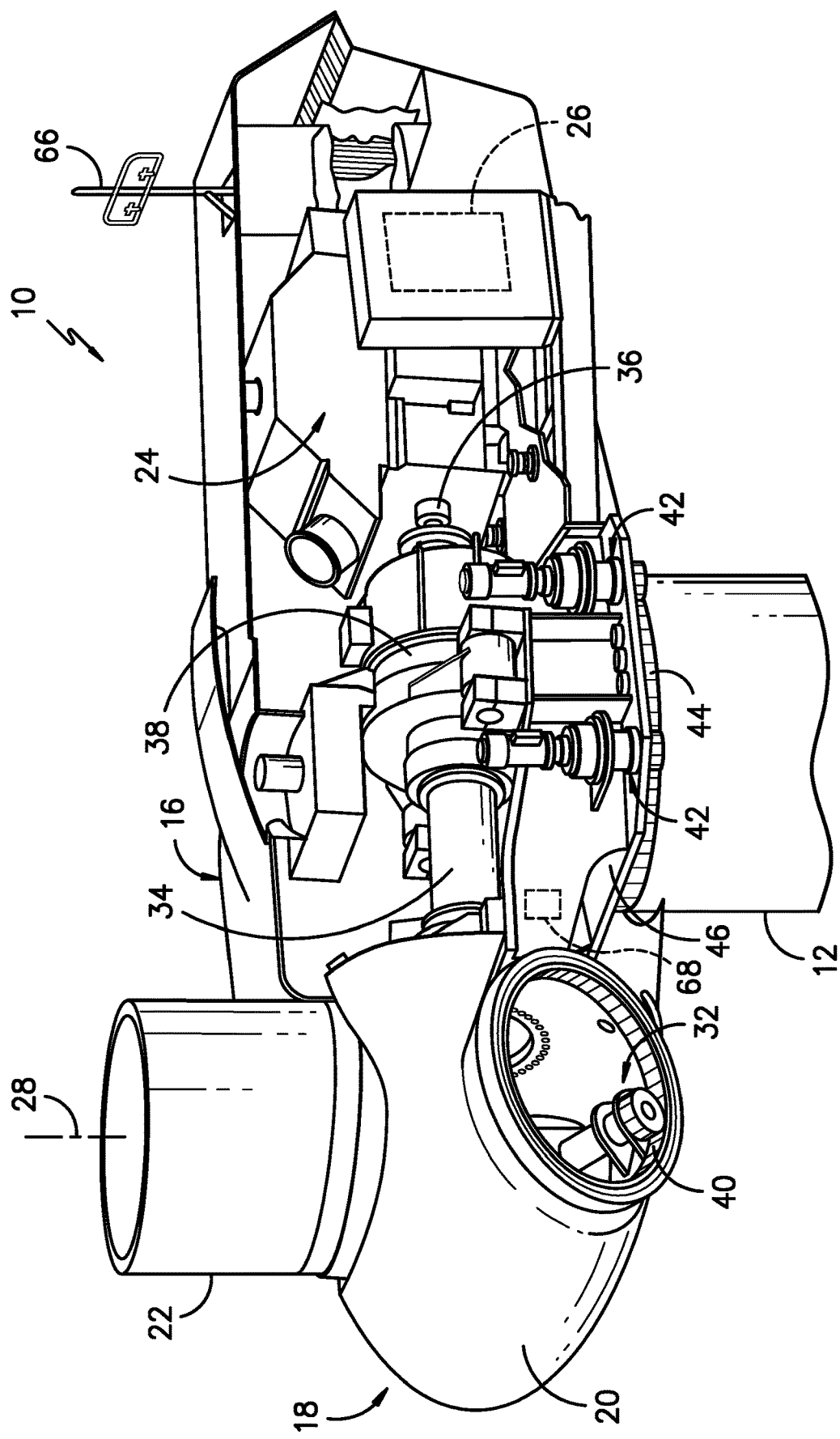
FIG. -3-

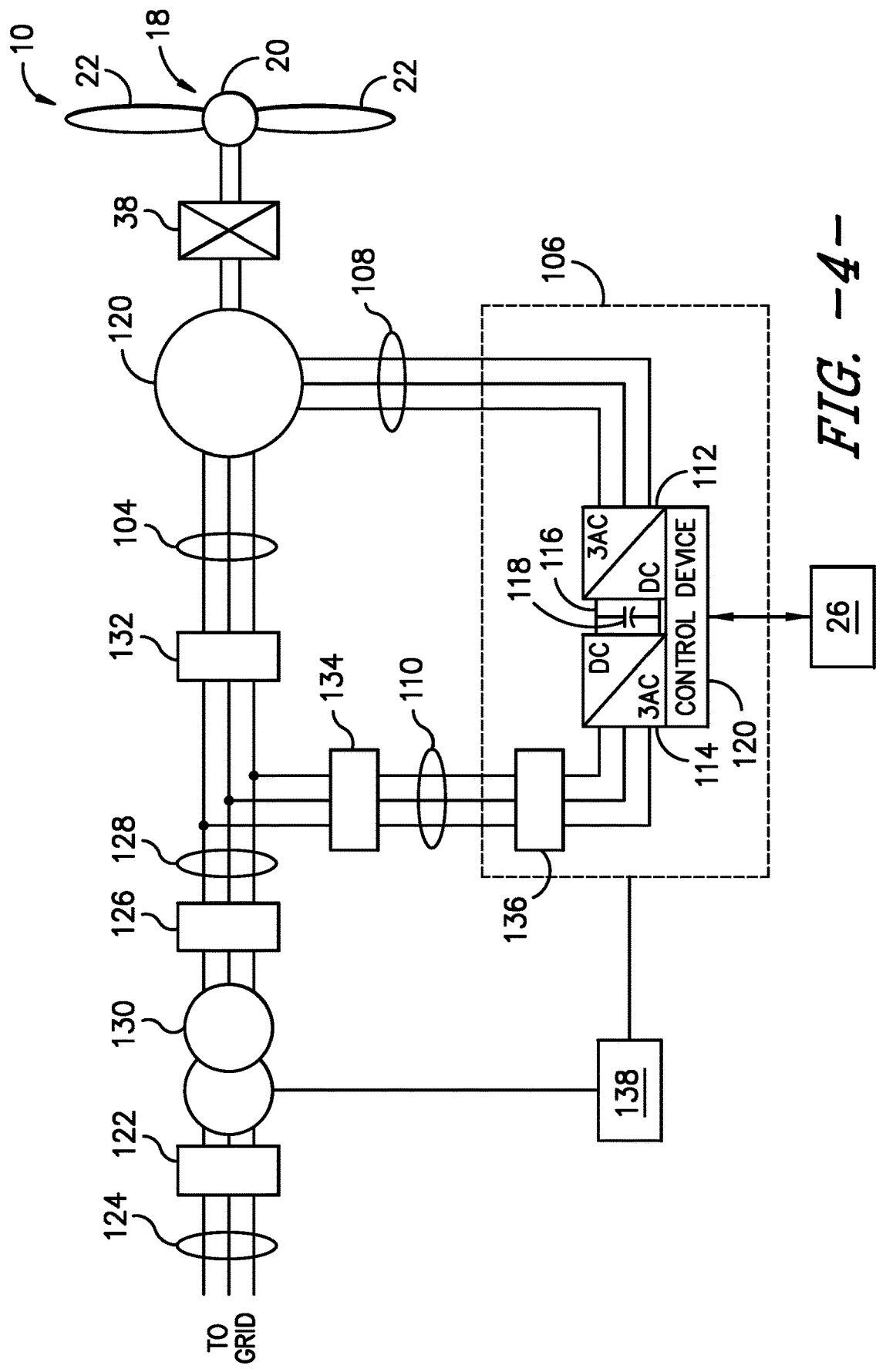
FIG. -4-

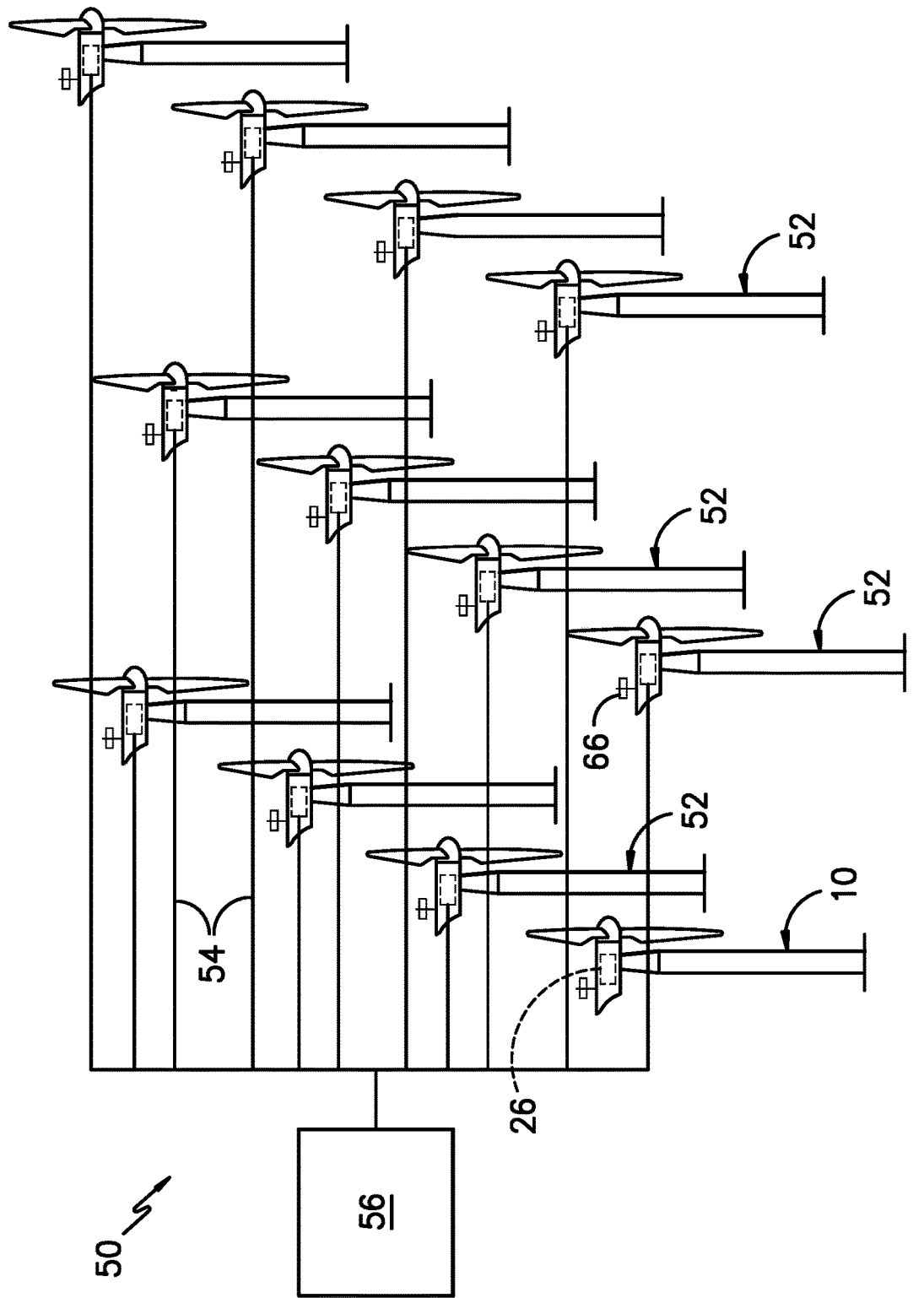

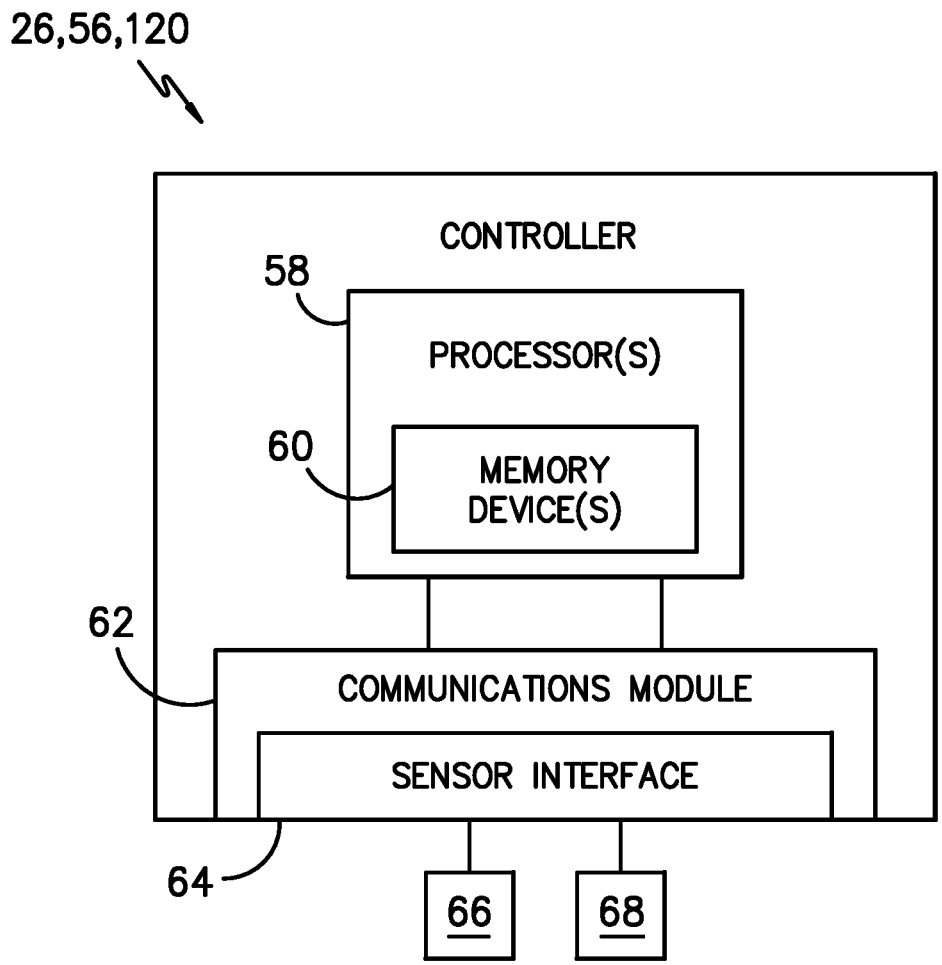
FIG. -6-

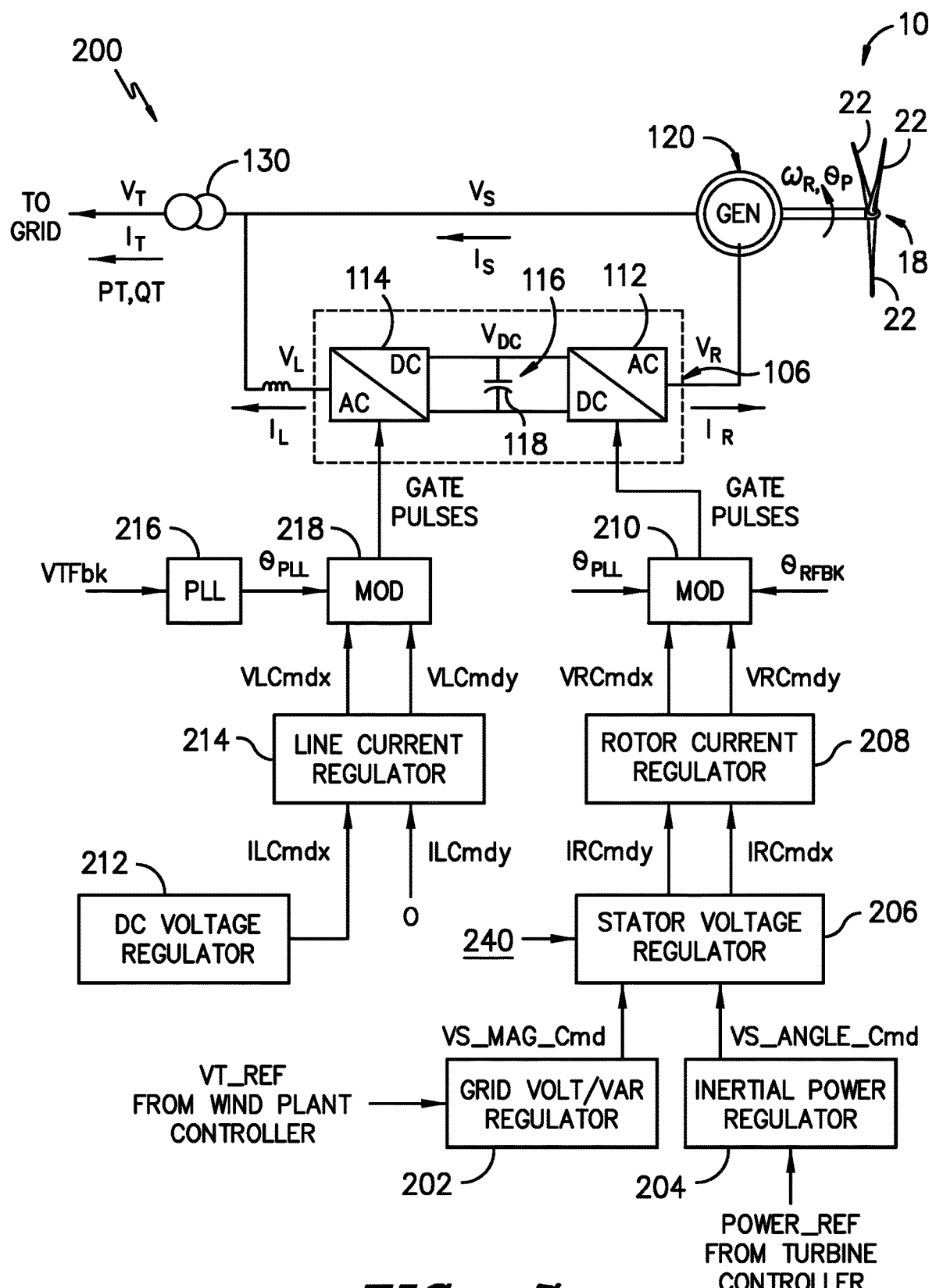
FIG. -7-

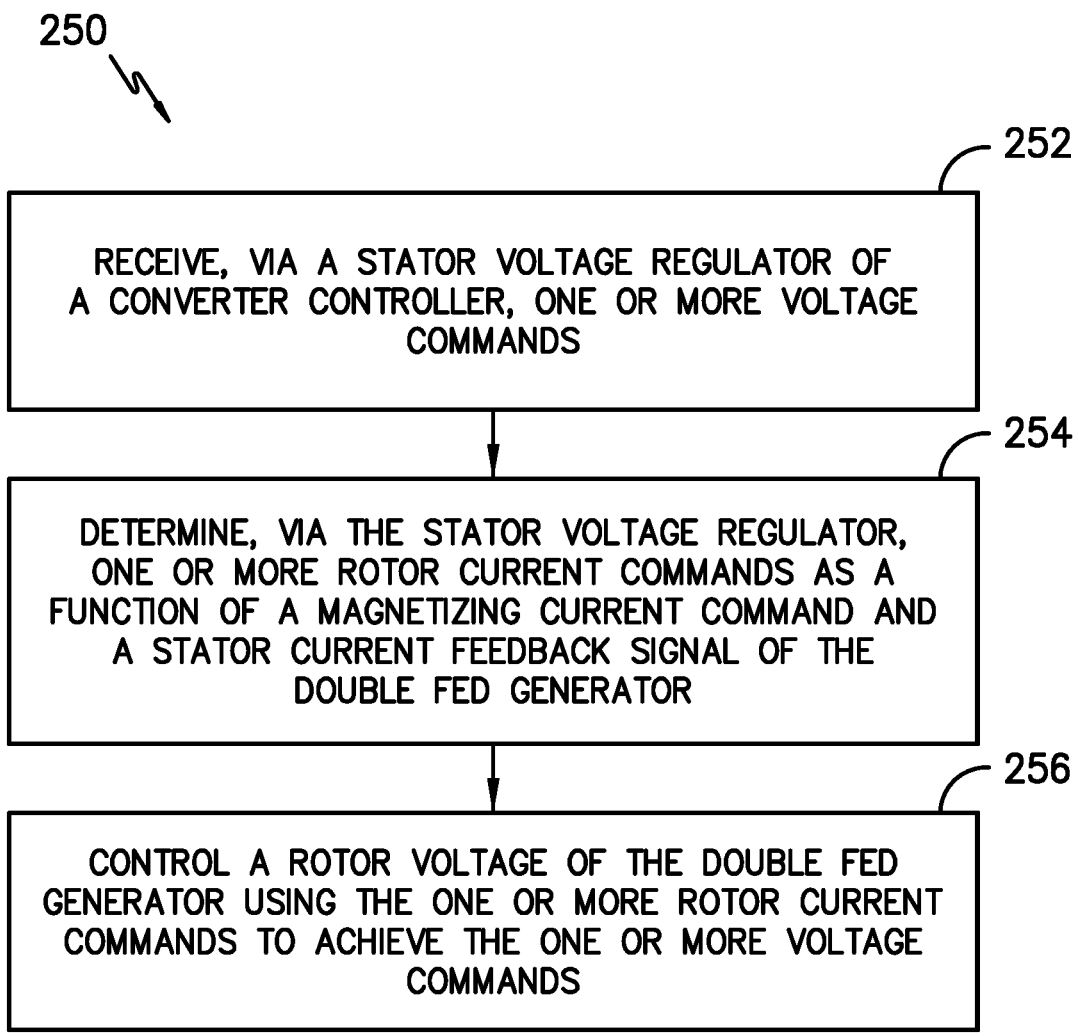
FIG. -8-

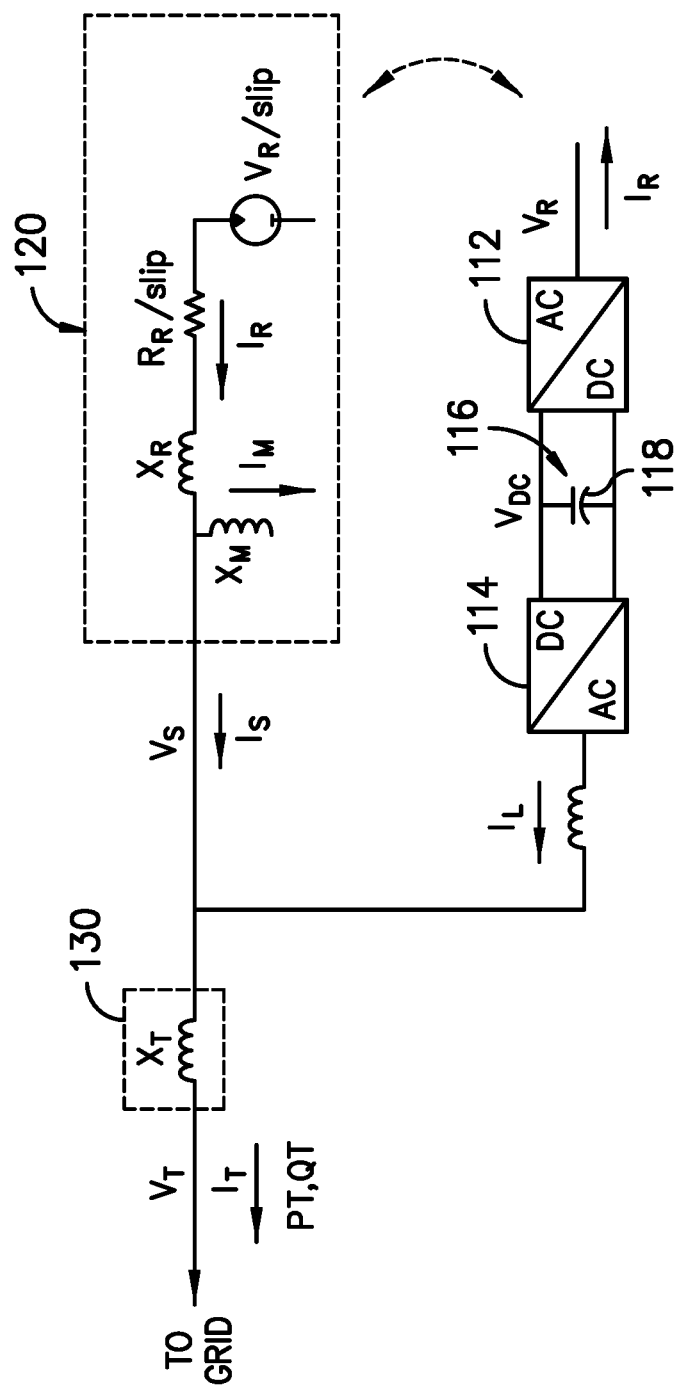
FIG. -9-

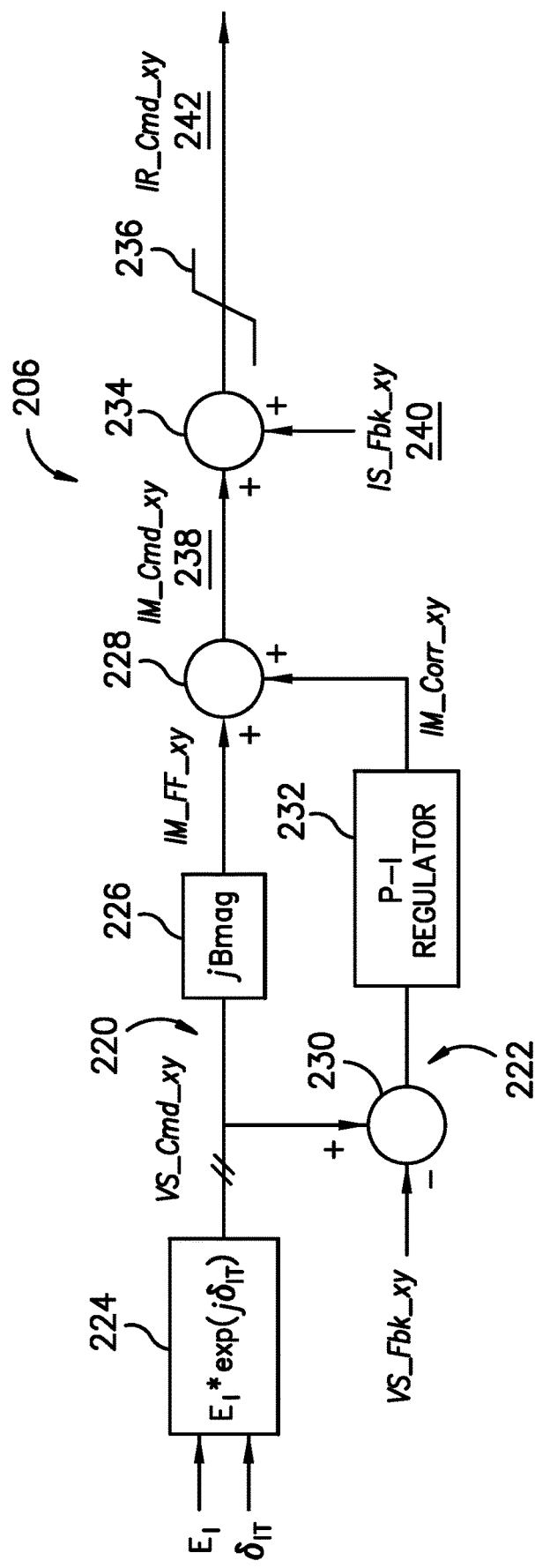
FIG. -10-
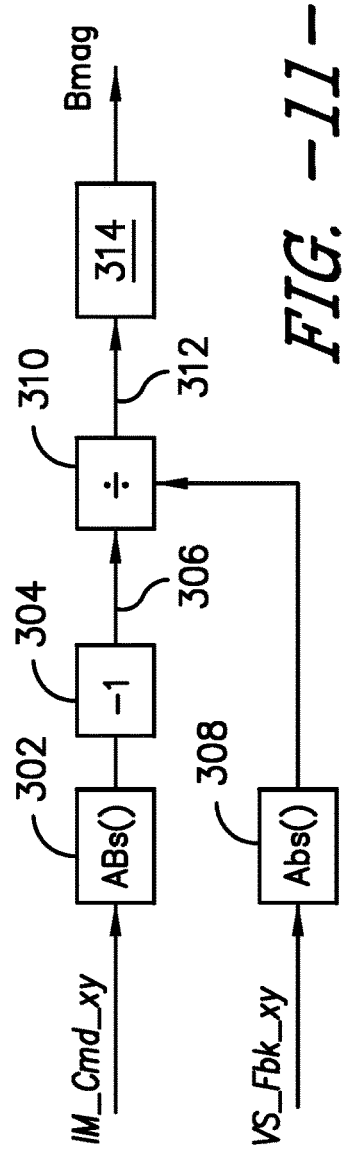
FIG. -11-

SYSTEM AND METHOD FOR PROVIDING GRID-FORMING CONTROL FOR A DOUBLE-FED WIND TURBINE GENERATOR

RELATED APPLICATIONS

The present application claims priority to PCT Application Serial Number PCT/US2020/013787, filed on Jan. 16, 2020, which is incorporated by reference herein.

FIELD

The present disclosure relates generally to wind turbines and, more particularly, to systems and methods for providing grid-forming control for a double-fed wind turbine generator.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g. the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in United States Publication No.: 2010/0142237 entitled "System and Method for Control of a Grid Connected Power Generating System," and U.S. Pat. No. 9,270,194 entitled "Controller for controlling a power converter." However, such implementations have been employed on full-converter wind generators.

In view of the foregoing, a system and method that addresses the aforementioned issues would be welcomed in the art. Accordingly, the present disclosure is directed to a system and method for applying grid-forming control to double-fed wind turbine generators.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of a double-fed generator of a wind turbine. The method includes receiving, via a stator voltage regulator of a converter controller, one or more voltage commands. Further, the method includes determining, via the stator voltage regulator, one or more rotor current commands as a function of a magnetizing current command and a stator current feedback signal of the double-fed generator. Thus, the method includes controlling a rotor voltage of the double-fed generator using the one or more rotor current commands to achieve the one or more voltage commands.

In an embodiment, the voltage command(s) may include, for example, a stator voltage magnitude command and/or a stator voltage angle command. More specifically, in an embodiment, the method may include determining the voltage command(s) via at least one of a voltage regulator, a VAR regulator, or an inertial power regulator using one or more reference commands.

In another embodiment, the method may include receiving the one or more reference commands from an external controller. In such embodiments, the external controller may include a turbine controller of the wind turbine or a farm-level controller of a wind farm that contains the wind turbine and at least one additional wind turbine.

In further embodiments, the reference command(s) may include at least one of a voltage reference or a VAR reference from the farm-level controller or a power reference from the turbine controller.

In an embodiment, the method may include converting, via the stator voltage regulator, the voltage command(s) to a stator voltage command, determining, via the stator voltage regulator, a magnetizing current feed forward signal as a function of the stator voltage command and a magnetizing admittance, the magnetizing current feed forward signal facilitating a rapid response of stator voltage to the stator voltage command, and adding the magnetizing current feed forward signal to a magnetizing current correction signal to determine the magnetizing current command.

In additional embodiments, the method may include receiving a stator voltage feedback signal, determining a difference between the stator voltage feedback signal and the stator voltage command, and determining the magnetizing current correction signal via a proportional-integral regulator.

In further embodiments, the method may include adaptively trimming the magnetizing admittance by computing an effective admittance as a function of the stator voltage feedback signal and the magnetizing current command. More specifically, in an embodiment, computing the effective admittance as a function of the stator voltage feedback signal and the magnetizing current command may include determining an absolute value of the magnetizing current command, inverting a sign of (e.g. from negative to positive or from positive to negative) the absolute value of the magnetizing current command to obtain a magnetizing current value, determining an absolute value of the stator voltage feedback signal, dividing the magnetizing current value by the absolute value of the stator voltage feedback signal to obtain a divided value, and filtering the divided value to remove noise and determine the effective admittance. In such embodiments, a response of the effective admittance may be slower than a response of the magnetizing current correction signal.

In another embodiment, determining the rotor current command(s) as a function of the magnetizing current command and the stator current feedback signal of the double-fed generator may include adding the magnetizing current command to the stator current feedback signal.

In still further embodiments, controlling the rotor voltage of the double-fed generator using the one or more voltage commands may include sending, via the stator voltage regulator, the one or more rotor current regulator commands to a rotor current regulator of the converter controller that provides control of the rotor voltage of the double-fed generator via the rotor-side power converter.

In another aspect, the present disclosure is directed to a converter controller for providing grid-forming control of a double-fed generator of a wind turbine. The converter controller includes, at least, a stator voltage regulator having at least one processor. The processor(s) is configured to perform a plurality of operations, including but not limited to receiving one or more voltage commands, determining one or more rotor current commands as a function of a magnetizing current command and a stator current feedback signal of the double-fed generator, and controlling a rotor voltage of the double-fed generator using the one or more rotor current commands to achieve the one or more voltage commands. It should be understood that the converter controller may further include any of the additional features described herein.

In yet another aspect, the present disclosure is directed to a method for providing grid-forming control of a double-fed generator of a wind turbine. The method includes measuring a stator current signal of the double-fed generator. Further, the method includes feeding the stator current signal into a rotor current command of the double-fed generator so as to substantially decouple a stator responsive stator voltage from one or more grid characteristics. Moreover, the method includes controlling a rotor voltage of the double-fed generator using the rotor current command. It should be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a one-line diagram of a double-fed wind turbine generator with structure of converter controls for grid-following application according to conventional construction;

FIG. 2 illustrates a perspective view of one embodiment of a wind turbine according to the present disclosure;

FIG. 3 illustrates a simplified, internal view of one embodiment of a nacelle according to the present disclosure;

FIG. 4 illustrates a schematic view of one embodiment of a wind turbine electrical power system suitable for use with the wind turbine shown in FIG. 1;

FIG. 5 illustrates a schematic view of one embodiment of a wind farm having a plurality of wind turbines according to the present disclosure;

FIG. 6 illustrates a block diagram of one embodiment of a controller according to the present disclosure;

FIG. 7 illustrates a one-line diagram of a double-fed wind turbine generator with converter controls for grid-forming application according to the present disclosure;

FIG. 8 illustrates a flow diagram of one embodiment of method for providing grid-forming control of a double-fed generator of a wind turbine according to the present disclosure;

FIG. 9 illustrates a schematic view of one embodiment of a simplified equivalent circuit of a double-fed wind turbine generator according to the present disclosure;

FIG. 10 illustrates a schematic view of one embodiment of logic to create rotor current commands for stator voltage regulation according to the present disclosure;

FIG. 11 illustrates a schematic view of one embodiment of logic to create an effective value of the magnetizing admittance for the predictive portion of control of a double-fed wind turbine generator according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and method for providing grid-forming control for double-fed wind turbine generators. More specifically, the systems described herein include grid-forming controls, such as an inertial power regulator and a terminal voltage regulator, that provide performance like a synchronous generator, with ability to set parameters as needed to meet grid requirements. These grid-forming controls develop commands for the magnitude and angle of the voltage at the source side of the transformer connecting to the grid. Thus, the systems and methods of the present disclosure implement the voltage command created by the grid-forming controls in a dual-fed wind turbine generator. Whereas in previous applications, the voltage is implemented directly by a power electronic converter, in the double-fed wind turbine generator, the voltage must be achieved indirectly via control of the rotor voltage. Thus, the present disclosure, the systems and methods of the present disclosure include an inner-loop current-regulator structure and a fast stator voltage regulator to convert voltage commands from the grid-forming controls to rotor current regulator commands.

Referring now to the drawings, FIG. 2 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 3) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46.

In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Referring now to FIG. 4, a schematic diagram of one embodiment of a wind turbine power system 100 is illustrated in accordance with aspects of the present disclosure. Although the present disclosure will generally be described herein with reference to the system 100 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 4 and as mentioned, the rotor 18 of the wind turbine 10 (FIG. 2) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 5, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g. through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Referring now to FIG. 6, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Referring now to FIGS. 7 and 8, a system 200 and method 250 for providing grid-forming control of a double-fed generator of a wind turbine according to the present disclosure is illustrated. FIG. 7 illustrates a schematic diagram of one embodiment of the system 200 according to the present disclosure, particularly illustrating a one-line diagram of the double-fed wind turbine generator 120 with a high-level control structure for grid-forming characteristics. FIG. 8 illustrates a flow diagram of one embodiment of method 250 for providing grid-forming control of the double-fed generator 120.

Referring particularly to FIG. 7, the system 200 may include many of the same features of FIG. 4 described herein, with components having the same reference characters representing like components. Further, as shown, the system 200 may include a control structure for controlling the line-side converter that is similar to the control structure shown in FIG. 1. More particularly, as shown, the line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g. a phase-locked loop angle) from a phase-locked loop 216 to generate one or more gate pulses for the line-side converter 114. The phase-locked loop 216 typically generates its output using a voltage feedback signal.

Furthermore, as shown, the system 200 may also include a unique control structure for controlling the rotor-side converter 112 using grid-forming characteristics. In particular, as shown in FIG. 8, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210. Such components and operation thereof can be better understood with reference to FIGS. 8-11.

More particularly, as will be explained, the system 200 includes an inner-loop current-regulator structure and a fast stator voltage regulator to convert voltage commands from the grid-forming controls to rotor current regulator commands. Thus, the system and method of the present disclosure provide control of the rotor voltage of the double-fed wind turbine generator 120 to meet a higher-level command for magnitude and angle of stator voltage. Such control must be relatively fast and insensitive to current flowing in the stator of the double-fed wind turbine generator 120. Accordingly, to more clearly explain the concept, a simplified equivalent circuit of the double-fed wind turbine generator 120 is shown in FIG. 9. More specifically, as shown, the simplified circuit neglects grid-side resistances, assumes stator leakage is zero and assumes unity turns ratio between rotor and stator. Thus, following relations describe the physical system, which are based on a rotating reference frame synchronized to the grid connection (VT) via the phase-locked loop (PLL). Variables in italics are complex phasors or impedances.

$$VS = VT + jXT * IT$$

$$IS = IT - IL$$

$$IR = IS + IM$$

$$IM = VS/(jXm) = jB\text{mag} * VS$$

$$VR = \text{slip} * (VS + IR * (RR + j\ XR * \text{slip}))$$

$$VS\_Cmd\_xy = E_I * [\cos(\delta_{IT}) + j\ \sin(\delta_{IT})] = VS\_Cmd\_x + j\ VS\_Cmd\_y$$

Definitions:
XT=transformer reactance
Xmag=magnetizing reactance
Bmag=−1/Xmag
RR,XR=rotor resistance and reactance Slip=1−rotor speed/synchronous speed
$E_I$=higher-level command for magnitude of VS
$\delta_{IT}$=higher-level command for angle of VS with respect to PLL angle Referring particularly now to FIG. 8, a flow diagram of one embodiment of the method 250 for providing grid-forming control of the double-fed generator 120 is provided. In general, the method 250 is described herein with reference to the wind turbine 10 of FIGS. 2-7. However, it should be appreciated that the disclosed method 250 may be implemented with wind turbines having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (252), the method 250 includes receiving, via the stator voltage regulator 206, one or more voltage commands. In addition, in an embodiment, the voltage command(s) may include a stator voltage magnitude command and/or a stator voltage angle command (i.e. VS_Mag_Cmd and VS_Angle_Cmd of FIG. 7). More specifically, in an embodiment, as shown in FIG. 7, the method 250 may include determining the voltage command(s) via at least one of the voltage/VAR regulator 202 or the inertial power regulator 204 using, e.g. one or more reference commands from an external controller. In an embodiment, the external controller may include, for example, the turbine controller 26 of the wind turbine 10 or the farm-level controller 56 of the wind farm 50. Thus, as shown, the reference command(s) may include at least one of a voltage reference (e.g. VT_Ref) or VAR reference from the farm-level controller 56 and/or a power reference (e.g. Power_Ref) from the turbine controller 26.

Referring back to FIG. 8, as shown at (254), the method 250 includes determining, via the stator voltage regulator 206, one or more rotor current commands (e.g. IRCmdy and IRCmdx of FIG. 7) as a function of a magnetizing current command 238 and/or a stator current feedback signal 240 of the double-fed generator 120. It should be understood that the stator feedback current 240 is a strong indicator of the characteristics of the externally connected power system, i.e. the grid. Therefore, the stator feedback current 240 can be used as a feedback signal to decouple the response of stator voltage to variations to the nature of the grid.

More particularly, as shown in FIG. 10, a schematic diagram of one embodiment of example components of the stator voltage regulator 206 is illustrated. In the illustrated embodiment, the signals are in x and y coordinates with reference to the terminal voltage phase angle. Complex variable notation is used for clarity. Further, as shown, the stator voltage regulator 206 may include a predictive path 220 and a corrector path 222. Further, as shown at the start of the predictive path 220, the stator voltage regulator 206 is configured to receive a higher level command (e.g. $E_I$) for magnitude of the stator voltage and a higher level command (e.g. $\delta_{IT}$) for angle of the stator voltage with respect to the phase-locked loop angle. Further, continuing along the predictive path 220, the stator voltage regulator 206 can then convert the voltage command(s) to a stator voltage command (e.g. VS_Cmd_xy) as shown at 224. The stator voltage regulator 206 may then determine a magnetizing current feed forward signal (e.g. IM_FF_xy) as a function of the stator voltage command and a magnetizing admittance (e.g. jBmag 226). In one embodiment, for example, the magnetizing admittance may correspond to a magnetizing susceptance. As such, the magnetizing current feed forward signal is configured to facilitate a rapid response of stator voltage to the stator voltage command.

Referring particularly to the corrective path 222, the stator voltage regulator 206 may also receive a stator voltage feedback signal (e.g. VS_Fbk_xy) and, as shown at 230, determine a difference between the stator voltage feedback signal and the stator voltage command from the predictive path 220. Thus, in an embodiment, as shown, the stator voltage regulator 206 may also determine a magnetizing current correction signal (e.g. IM_Corr_xy) via a proportional-integral regulator 232. Accordingly, as shown at 228 in the predictive path 220, the stator voltage regulator 206 can then add the magnetizing current feed forward signal to the magnetizing current correction signal to determine the magnetizing current command 238 (e.g. IM_Cmd_xy). In alternative embodiments, the magnetizing current command 238 may be a constant value.

Furthermore, as shown at 234, the stator voltage regulator 206 may determine the rotor current command(s) (e.g. IM_Cmd_xy) as a function of the magnetizing current command 238 (e.g. IS_Fbk_xy) and the stator current feedback signal 240 (e.g. IS_Fbk_xy) of the double-fed generator 120. For example, in an embodiment, the stator current feedback signal 240 of the double-fed generator 120 may be measured. Thus, in an embodiment, the measured stator current signal 240 of the double-fed generator 120 may be fed into a rotor current command of the double-fed generator 120, as shown at 234, so as to substantially decouple a stator responsive stator voltage from one or more grid characteristics. More specifically, in particular embodiments, as shown, the stator voltage regulator 206 may determine the rotor current command(s) 242 by adding the magnetizing current command 238 to the measured stator current feedback signal 240. In addition, as shown at 236, a limiter 236 may place limits to the rotor current command as appropriate to respect equipment rating(s).

Thus, referring back to FIG. 8, as shown at (256), the method 250 also includes controlling a rotor voltage of the double-fed generator 120 using the one or more rotor current commands to achieve the higher-level voltage command(s). For example, as shown in FIG. 7, the output from the stator voltage regulator 206 is a command for rotor current, which is implemented in the rotor current regulator 208 by generating rotor voltage commands (e.g. VRCmdx and VRCmdy) for the modulator 210. The modulator 210 also receives the phase-locked loop angle from the phase-locked loop 216 and a reference angle to generate one or more gate pulses for the rotor-side converter 112.

Referring now to FIG. 11, in certain embodiments, the method 250 may also include adaptively trimming the magnetizing admittance by computing an effective admittance as a function of the stator voltage feedback signal and the magnetizing current command. More specifically, in an embodiment, as shown in FIG. 11, the converter controller 120 may implement a control scheme 300 for computing the effective admittance (e.g. Bmag). For example, as shown, the control scheme 300 may include determining an absolute value 302 of the magnetizing current command (IM_Cmd_xy). Further, as shown at 304, the control scheme 300 may include inverting the sign of the magnetizing current command to obtain a magnetizing current value 306. Moreover, as shown at 308, the control scheme 300 may include determining an absolute value of the stator voltage feedback signal (e.g. VS_Fbk_xy). Thus, as shown at 310, the control scheme 300 may include dividing the magnetizing current value by the absolute value of the stator voltage feedback signal to obtain a divided value 312. Accordingly, as shown at 314, the control scheme 300 may include filtering the divided value 312 to remove noise and determine the effective admittance Bmag. In such embodiments, a response of the effective admittance may be slower than a response of the magnetizing current correction signal.

Further aspects of the invention are provided by the subject matter of the following clauses:

Clause 1. A method for providing grid-forming control of a double-fed generator of a wind turbine, the method comprising:
receiving, via a stator voltage regulator of a converter controller, one or more voltage commands;
determining, via the stator voltage regulator, one or more rotor current commands as a function of a magnetizing current command and a stator current feedback signal of the double-fed generator; and,
controlling a rotor voltage of the double-fed generator using the one or more rotor current commands to achieve the one or more voltage commands.

Clause 2. The method of clause 1, wherein the one or more voltage commands comprise at least one of a stator voltage magnitude command or a stator voltage angle command.

Clause 3. The method of clause 2, further comprising determining the one or more voltage commands via at least one of a voltage regulator, a VAR regulator, or an inertial power regulator using one or more reference commands.

Clause 4. The method of clause 3, further comprising receiving the one or more reference commands from an external controller, the external controller comprising at least one of a turbine controller of the wind turbine or a farm-level controller of a wind farm comprising the wind turbine and at least one additional wind turbine.

Clause 5. The method of clause 4, wherein the one or more reference commands comprise at least one of a voltage reference from the farm-level controller or a power reference from the turbine controller.

Clause 6. The method of any of the preceding clauses, further comprising:
converting, via the stator voltage regulator, the one or more voltage commands to a stator voltage command;
determining, via the stator voltage regulator, a magnetizing current feed forward signal as a function of the stator voltage command and a magnetizing admittance, the magnetizing current feed forward signal facilitating a rapid response of stator voltage to the stator voltage command; and,
adding the magnetizing current feed forward signal to a magnetizing current correction signal to determine the magnetizing current command.

7. The method of clause 6, further comprising:
receiving a stator voltage feedback signal;
determining a difference between the stator voltage feedback signal and the stator voltage command; and,
determining the magnetizing current correction signal via a proportional-integral regulator.

Clause 8. The method of clause 7, further comprising adaptively trimming the magnetizing admittance by computing an effective admittance as a function of the stator voltage feedback signal and the magnetizing current command.

Clause 9. The method of clause 8, wherein computing the effective admittance as a function of the stator voltage feedback signal and the magnetizing current command further comprises:
determining an absolute value of the magnetizing current command;
inverting a sign of the magnetizing current command to obtain a magnetizing current value;
determining an absolute value of the stator voltage feedback signal;
dividing the magnetizing current value by the absolute value of the stator voltage feedback signal to obtain a divided value; and,
filtering the divided value to remove noise and determine the effective admittance.

Clause 10. The method of clause 9, wherein a response of the effective admittance is slower than a response of the magnetizing current correction signal.

Clause 11. The method of clause 6, wherein determining the one or more rotor current commands as a function of the magnetizing current command and the stator current feedback signal of the double-fed generator further comprises:
adding the magnetizing current command to the stator current feedback signal.

Clause 12. The method any of the preceding clauses, wherein controlling the rotor voltage of the double-fed generator using the one or more voltage commands further comprises:
sending, via the stator voltage regulator, the one or more rotor current regulator commands to a rotor current regulator of the converter controller that provides control of the rotor voltage of the double-fed generator via the rotor-side power converter.

Clause 13. A converter controller for providing grid-forming control of a double-fed generator of a wind turbine, the converter controller comprising:
a stator voltage regulator comprising at least one processor, the at least one processor configured to perform a plurality of operations, the plurality of operations comprising:
receiving one or more voltage commands;
determining one or more rotor current commands as a function of at least one of a magnetizing current command and a stator current feedback signal of the double-fed generator; and,
controlling a rotor voltage of the double-fed generator using the one or more rotor current commands to achieve the one or more voltage commands.

Clause 14. The converter controller of clause 13, wherein the one or more voltage commands comprise at least one of a stator voltage magnitude command or a stator voltage angle command.

Clause 15. The converter controller of clause 14, further comprising:
a voltage/VAR regulator for receiving a voltage reference or a VAR reference from a farm-level controller and determining the stator voltage magnitude command based on at least one of the voltage reference or the VAR reference.

Clause 16. The converter controller of clause 14, further comprising: an inertial power regulator for receiving a power reference from a turbine controller of the wind turbine and determining the stator voltage magnitude command based on the power reference.

Clause 17. The converter controller of clauses 13-16, wherein the plurality of operations further comprise:

converting the one or more voltage commands to a stator voltage command;
determining a magnetizing current feed forward signal as a function of the stator voltage command and a magnetizing admittance, the magnetizing current feed forward signal facilitating a rapid response of stator voltage to the stator voltage command;
adding the magnetizing current feed forward signal to a magnetizing current correction signal to determine the magnetizing current command; receiving a stator voltage feedback signal;
determining a difference between the stator voltage feedback signal and the stator voltage command; and,
determining the magnetizing current correction signal via a proportional-integral regulator.

Clause 18. The converter controller of clause 17, wherein determining the one or more rotor current commands as a function of at least one of the magnetizing current command and the stator current feedback signal of the double-fed generator further comprises:
adding the magnetizing current command to the stator current feedback signal.

Clause 19. The converter controller of clauses 13-18, wherein controlling the rotor voltage of the double-fed generator using the one or more voltage commands further comprises:
sending, via the stator voltage regulator, the one or more rotor current regulator commands to a rotor current regulator of the converter controller that provides control of the rotor voltage of the double-fed generator via the rotor-side power converter.

Clause 20. A method for providing grid-forming control of a double-fed generator of a wind turbine, the method comprising:
measuring a stator current signal of the double-fed generator; and,
feeding the stator current signal into a rotor current command of the double-fed generator so as to substantially decouple a stator responsive stator voltage from one or more grid characteristics; and,
controlling a rotor voltage of the double-fed generator using the rotor current command.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing grid-forming control of a double-fed generator of a wind turbine, the method comprising:
receiving, via a stator voltage regulator of a converter controller, one or more stator voltage commands, the one or more voltage commands comprising a stator voltage magnitude and a stator voltage angle;
determining, via the stator voltage regulator, one or more rotor current commands as a function of a magnetizing current command and a stator current feedback signal of the double-fed generator to create a voltage source, wherein the stator voltage regulator creates the voltage source of the grid forming control of the double-fed generator; and
controlling a rotor voltage of the double-fed generator using the one or more rotor current commands to achieve the one or more stator voltage commands having the stator voltage magnitude and the stator voltage angle, thereby providing the grid-forming control of the double-fed generator, wherein the double-fed generator is operated to provide at least one of inertia, voltage magnitude, or voltage phase angle support to an external electrical network.

2. The method of claim 1, further comprising determining the one or more stator voltage commands via at least one of a voltage regulator, a VAR regulator, or an inertial power regulator using one or more reference commands.

3. The method of claim 2, further comprising receiving the one or more reference commands from an external controller, the external controller comprising at least one of a turbine controller of the wind turbine or a farm-level controller of a wind farm comprising the wind turbine and at least one additional wind turbine.

4. The method of claim 3, wherein the one or more reference commands comprise at least one of a voltage reference from the farm-level controller or a power reference from the turbine controller.

5. The method of claim 1, further comprising:
converting, via the stator voltage regulator, the one or more stator voltage commands to a stator voltage command;
determining, via the stator voltage regulator, a magnetizing current feed forward signal as a function of the stator voltage command and a magnetizing admittance, the magnetizing current feed forward signal facilitating a rapid response of stator voltage to the stator voltage command; and
adding the magnetizing current feed forward signal to a magnetizing current correction signal to determine the magnetizing current command.

6. The method of claim 5, further comprising:
receiving a stator voltage feedback signal;
determining a difference between the stator voltage feedback signal and the stator voltage command; and,
determining the magnetizing current correction signal via a proportional-integral regulator.

7. The method of claim 6, further comprising adaptively trimming the magnetizing admittance by computing an effective admittance as a function of the stator voltage feedback signal and the magnetizing current command.

8. The method of claim 7, wherein computing the effective admittance as a function of the stator voltage feedback signal and the magnetizing current command further comprises:
determining an absolute value of the magnetizing current command;
inverting a sign of the magnetizing current command to obtain a magnetizing current value;
determining an absolute value of the stator voltage feedback signal;
dividing the magnetizing current value by the absolute value of the stator voltage feedback signal to obtain a divided value; and,
filtering the divided value to remove noise and determine the effective admittance.

9. The method of claim 8, wherein a response of the effective admittance is slower than a response of the magnetizing current correction signal.

10. The method of claim 5, wherein determining the one or more rotor current commands as a function of the magnetizing current command and the stator current feedback signal of the double-fed generator further comprises:
adding the magnetizing current command to the stator current feedback signal.

11. A converter controller for providing grid-forming control of a double-fed generator of a wind turbine, the converter controller comprising:
a stator voltage regulator comprising at least one processor, the at least one processor configured to perform a plurality of operations, the plurality of operations comprising:
receiving one or more stator voltage commands, the one or more voltage commands comprising a stator voltage magnitude and a stator voltage angle;
determining one or more rotor current commands as a function of at least one of a magnetizing current command and a stator current feedback signal of the double-fed generator to create a voltage source, wherein the stator voltage regulator creates the voltage source of the grid forming control of the double-fed generator; and
controlling a rotor voltage of the double-fed generator using the one or more rotor current commands to achieve the one or more stator voltage commands, thereby providing the grid-forming control of the double-fed generator, wherein the double-fed generator is operated to provide at least one of inertia, voltage magnitude, or voltage phase angle support to an external electrical network.

12. The converter controller of claim 11, further comprising:
a voltage/VAR regulator for receiving a voltage reference or a VAR reference from a farm-level controller and determining the stator voltage magnitude command based on at least one of the voltage reference or the VAR reference.

13. The converter controller of claim 11, further comprising: an inertial power regulator for receiving a power reference from a turbine controller of the wind turbine and determining the stator voltage magnitude command based on the power reference.

14. The converter controller of claim 11, wherein the plurality of operations further comprise:
converting the one or more stator voltage commands to a stator voltage command;
determining a magnetizing current feed forward signal as a function of the stator voltage command and a magnetizing admittance, the magnetizing current feed forward signal facilitating a rapid response of stator voltage to the stator voltage command;
adding the magnetizing current feed forward signal to a magnetizing current correction signal to determine the magnetizing current command;
receiving a stator voltage feedback signal;
determining a difference between the stator voltage feedback signal and the stator voltage command; and
determining the magnetizing current correction signal via a proportional-integral regulator.

15. The converter controller of claim 14, wherein determining the one or more rotor current commands as a function of at least one of the magnetizing current command and the stator current feedback signal of the double-fed generator further comprises:
adding the magnetizing current command to the stator current feedback signal.

* * * * *